Patented Jan. 10, 1933

1,893,946

UNITED STATES PATENT OFFICE

OSCAR KASELITZ, OF BERLIN, GERMANY

PRODUCTION OF CALCIUM NITRATE

No Drawing. Application filed January 9, 1932, Serial No. 585,803, and in Germany February 24, 1931.

My invention refers to the production of nitrates of alkaline earth metals and more particularly calcium nitrate by the interaction of basic calcium compounds with nitric acid or nitrous gases. It is an object of my invention to avoid certain difficulties encountered in the usual methods of producing calcium nitrate and to provide a simple and efficient procedure, by which a substantially anhydrous and substantially neutral product is obtained.

It has already been proposed to produce nitrates of alkaline earth metals by treating the oxides, hydroxides or carbonates of such metals with liquid or vaporous nitric acid or with nitrous gases, and it has been found that it is advantageous to carry out these reactions at an elevated temperature so as to directly obtain a solid final product. It is, however, difficult if not impossible to obtain in such way a product which is practically free from nitrites, moisture and unconverted basic alkaline earth compounds.

In the course of my investigations, I have ascertained that on treating the usual basic calcium compounds with nitrous gases or the like, the reaction cannot be brought to completion, unconverted particles remaining over even after a prolonged treatment with the nitrous gases. Moreover, if the temperature is further raised, the reaction mass is liable to sinter, whereby further amounts of the basic calcium compounds are prevented from being converted into calcium nitrate. Apart therefrom the volume of the mass is increased in the course of the reaction, the mass becoming impenetrable to the nitrous gases.

According to the present invention I avoid these drawbacks by mixing the basic calcium compound with solid, molten or dissolved calcium nitrate before subjecting it to the action of nitrous gases or vapours of nitric acid. Homogeneous mixtures are preferred, and it has also been found advantageous to shape the mixture in the form of granules, agglomerates, briquettes or the like before subjecting it to the action of the nitrous gases or the nitric acid vapours.

By using such a mixture, which obviously contains some basic calcium nitrate formed by the interaction of the neutral calcium nitrate with calcium oxide, hydroxide or carbonate, the speed of reaction is rendered more uniform, an undue superheating during the initial period of the reaction being avoided. On the other hand such a mixture can be readily and substantially completely converted into neutral calcium nitrate at temperatures as low as 200° C. and even at lower temperatures. I do not wish to limit my invention to a certain range of temperature, but I believe it worth mentioning that the reaction may be carried through with advantage at temperatures of 300–350° and at any rate above 200° C., whereby any water contained in the mixture is evaporated. Nevertheless there is no danger of sintering or caking of the reaction mass, and the final product is substantially free from unconverted basic calcium compounds, from nitrites and from water, practically completely soluble in water and has a neutral reaction.

In carrying out my invention I may proceed in various ways depending on the type of basic calcium compounds which are to be converted into calcium nitrate, and on the type and concentration of nitric acid vapours or nitrous gases, which are to be used. I may use quicklime and slake it with the aid of a watery solution of calcium nitrate, but I may also impregnate granulated quicklime with molten calcium nitrate. Slaked lime may be mixed with solid pulverized calcium nitrate, or may be agglomerated with the aid of concentrated watery solutions of calcium nitrate, in a similar manner as described in my copending application for Letters Patent of the United States Serial No. 578,662 entitled "Mixed fertilizer". If calcium carbonate shall be used I may powder it and mix it with powdered calcium nitrate; in such a case I may treat the powdery mixture under stirring with nitric acid vapours or nitrous gases (for instance those obtained by the combustion of ammonia), the mixture being highly penetrable to the gases or vapours. I may, however, also agglomerate the powdered mixture thus obtained in a similar manner as described in my copending application mentioned above or form porous briquettes therefrom, which also react readily and completely without becoming impenetrable to gases.

*Example 1*

Limestone is powdered to obtain an average particle size below 0.1 mm. and agglomerated in a rotating drum at ordinary room temperature with the aid of regulated amounts of a concentrated watery solution of calcium nitrate, the moist crumbly mass first obtained being kept in motion until globular granules or agglomerates have formed. As a rule 9 parts by weight of limestone require 1 part of the calcium nitrate solution to obtain suitable agglomerates which are subsequently dried and subjected to the action of nitrous gases at an elevated temperature until a substantially neutral product has been obtained.

The details of the agglomerating step are more fully described in my copending application mentioned above.

*Example 2*

Calcium hydroxide (slaked lime) is agglomerated with the aid of a concentrated calcium nitrate solution substantially as described with reference to Example 1 so as to obtain substantially globular agglomerates or granules of the size of peas or hazelnuts, which are then treated with nitric acid vapours or nitrous gases.

*Example 3*

100 parts by weight granular quicklime are slaked under stirring with 60 parts of a 40% calcium nitrate solution, until a practically homogeneous mass is obtained. This mass is filled into wooden moulds, where it solidifies to form briquettes. These briquettes are converted into substantially neutral calcium nitrate by treating them with nitrous gases or with vapours of nitric acid.

*Example 4*

Granular quicklime is introduced into molten calcium nitrate to obtain granules which partly consist of basic calcium nitrate, and further treated with nitrous gases at an elevated temperature to obtain anhydrous neutral calcium nitrate.

*Example 5*

150 kgs. of agglomerates obtained from slaked lime and from a calcium nitrate solution substantially as described with reference to Example 2 are treated with nitrous gases obtained by the combustion of ammonia, the reaction temperature being gradually raised from 250 to 360° C. After a 50 hours' treatment there are obtained 330 kgs. loose agglomerates having the shape of the original ones but consisting of anhydrous neutral calcium nitrate.

*Example 6*

450 kgs. globular granules obtained by agglomerating powdery limestone with a calcium nitrate solution, as described with reference to Example 1, are treated, at a temperature of about 330–360° C., with a current of humid nitrous gases obtained by the combustion of ammonia. After 120 hours there are obtained 730 kgs. of a product which consists of anhydrous neutral calcium nitrate and contains but small traces of contaminations.

*Example 7*

130 kgs. of a briquetted mixture obtained by introducing granulated quicklime (calcium oxide) into molten calcium nitrate as described with reference to Example 4, and briquetting the mixture, are treated with humid nitrous gases at a temperature of 250–360° C. After 50 hours of such treatment there are obtained 320 kgs. anhydrous neutral calcium nitrate.

In the claims affixed to this specification and forming part thereof the term "basic calcium compounds" is intended to designate calcium compounds such as calcium oxide, hydroxide, carbonate and the like which are capable of reacting with vaporous nitric acid or with nitrous gases, calcium nitrate being formed; the term "nitrous gases" including gases containing $NO_2$ or $NO$, preferably in mixture with oxygen and steam, as is usual in the art, and nitric acid vapours.

Various changes may be made in the details disclosed in the foregoing specification without departing from the invention or sacrificing the advantages thereof.

I claim:—

1. The method of producing solid calcium nitrate directly from basic calcium compounds comprising mixing such a basic calcium compound with calcium nitrate and treating said mixture with nitrous gases at an elevated temperature.

2. The method of producing solid calcium nitrate directly from basic calcium compounds comprising homogeneously mixing such a basic calcium compound with calcium nitrate and treating said mixture with nitrous gases at an elevated temperature.

3. The method of producing solid calcium nitrate directly from basic calcium compounds comprising mixing such a basic calcium compound with calcium nitrate and treating said mixture with nitrous gases at a temperature above 200° C.

4. The method of producing solid calcium nitrate directly from basic calcium compounds comprising introducing granulated quicklime into molten calcium nitrate and treating said mixture with nitrous gases at an elevated temperature.

5. The method of producing solid calcium nitrate directly from basic calcium compounds comprising slaking quicklime with a watery solution of calcium nitrate, shaping the mixture thus obtained and treating the shapes after solidification with nitrous gases at an elevated temperature.

6. The method of producing solid calcium nitrate directly from basic calcium compounds comprising slaking quicklime with a watery solution of calcium nitrate, briquetting the mixture thus obtained and treating the briquettes after solidification with nitrous gases at an elevated temperature.

7. The method of producing solid calcium nitrate directly from basic calcium compounds comprising mixing powdery calcium carbonate with calcium nitrate and treating the mixture thus obtained with nitrous gases at an elevated temperature.

8. The method of producing solid calcium nitrate directly from basic calcium compounds comprising mixing powdery calcium carbonate with a regulated quantity of a watery solution of calcium nitrate, keeping the crumbly mass thus obtained in motion until granular agglomerates have formed and treating said granules with nitrous gases at an elevated temperature.

In testimony whereof I affix my signature.

OSCAR KASELITZ.